(12) United States Patent
Lutz et al.

(10) Patent No.: US 8,095,302 B2
(45) Date of Patent: Jan. 10, 2012

(54) DISCREPANCY REPORTING IN ELECTRONIC MAP APPLICATIONS

(75) Inventors: André Lutz, Neu-Isenburg (DE); Patrick Wipplinger, Mörfelden-Walldorf (DE)

(73) Assignee: The Boeing Company, Chicago, IL (US)

( * ) Notice: Subject to any disclaimer, the term of this patent is extended or adjusted under 35 U.S.C. 154(b) by 981 days.

(21) Appl. No.: 12/042,189

(22) Filed: Mar. 4, 2008

(65) Prior Publication Data

US 2009/0228195 A1    Sep. 10, 2009

(51) Int. Cl.
    *G01C 21/00*    (2006.01)
(52) U.S. Cl. ..................... 701/200; 340/995.1
(58) Field of Classification Search .................. 701/200, 701/207, 208; 340/995.1, 995.14, 995.16, 340/995.18
    See application file for complete search history.

(56) References Cited

U.S. PATENT DOCUMENTS

| | | | | |
|---|---|---|---|---|
| 6,718,258 | B1 * | 4/2004 | Barton | 701/200 |
| 7,345,693 | B2 * | 3/2008 | Coldefy et al. | 345/660 |
| 7,363,151 | B2 * | 4/2008 | Nomura et al. | 701/208 |

* cited by examiner

*Primary Examiner* — Dalena Tran
(74) *Attorney, Agent, or Firm* — Yee & Associates, P.C.

(57) ABSTRACT

A computer implemented method, apparatus, and computer usable program code for proposing an update for a navigation chart displayed in an aircraft data processing system. A selection of a navigation object is received in the navigation chart through the aircraft data processing system. In response to receiving the selection, a set of attributes is presented for the navigation object, wherein each attribute can be selected containing a discrepancy. In response to receiving user input to change an attribute in the set of attributes, the attribute is changed using the user input. A discrepancy report is directly sent to the data provider via a datalink.

26 Claims, 5 Drawing Sheets

DISCREPANCY REPORTING IN ELECTRONIC MAP APPLICATIONS

BACKGROUND INFORMATION

1. Field

The present disclosure relates generally to an improved data processing system and in particular to a method and apparatus for providing timely pilot generated notifications for updates or corrections in electronic map applications.

2. Background

Pilots use aeronautical charts in planning flights and during actual flights. An aeronautical chart is a type of navigation chart or map designed to assist in the navigation of aircraft on the ground or in the air. With these charts and other tools, pilots are able to identify information, such as, for example, their position, safe altitude, best route to a destination, navigation aids or waypoints, alternative landing sites in case of emergency, and other useful information. Other information that may be provided by aeronautical charts includes radio frequencies and airspace boundaries.

These navigation charts may be in the electronic form and presented through electronic map applications. In addition to displaying navigation charts, these electronic maps also may provide a moving map function. A moving map function displays the location of an aircraft relative to the underlying georeferenced aeronautical information. Further, the moving map function also may provide a direction of travel for the aircraft.

Navigation charts are carefully reviewed to eliminate errors prior to their distribution or use; however, discrepancies may be present in these navigation charts. Discrepancies may be caused by unexpected changes to features, landmarks, or elements shown on the charts. In other cases, discrepancies may occur through delayed reporting or entry of data. These and other types of charting issues may be identified during actual use of the navigation charts.

For example, a pilot may notice that a taxiway is temporarily closed for repairs when the navigation chart shows that it is open. This may be reported in a number of different ways. Pilots and other personnel may provide chart update reports through a telephone hotline, by sending emails, faxes, letters, or other suitable communications to the appropriate authority. These update reports may be used to update information for the navigation charts to ensure that the navigation charts accurately report real world features represented in the navigation charts.

Most discrepancies are quickly identified and updated in the navigation charts. This type of reporting, however, is cumbersome and time consuming. As a result, pilots or other aircraft crew may not report minor issues that do not have any relation to safely operating the aircraft. Also, these reports are made after the flight has occurred and unless the issues are considered to be great enough, many of them could remain unreported.

Therefore, it would be advantageous to have a computer implemented method, apparatus, and computer usable program code for overcoming the issues described above.

SUMMARY

The advantageous embodiments provide a computer implemented method, apparatus, and computer usable program code for proposing an update for a navigation chart displayed in an aircraft data processing system. A selection of a navigation object is received in the navigation chart through the aircraft data processing system. In response to receiving the selection, a set of attributes is presented for the navigation object, wherein each attribute can be selected containing a discrepancy. In response to receiving user input to change an attribute in the set of attributes, the attribute is changed using the user input.

In another advantageous embodiment, a method is present for identifying discrepancies in a navigation chart. A navigation chart is displayed on a display of a data processing system. In response to a selected user input selecting a navigation object in the navigation chart, an indication of a discrepancy for the navigation object is recorded. These discrepancies may be evaluated prior to making a chart of database identified modifications to avoid inadvertent or malicious alterations.

In yet another advantageous embodiment, a data processing system comprising a bus, a communications unit connected to the bus, a storage device, and a processor unit. The storage device includes computer usable program code. The processor unit executes the computer usable program code to display a navigation chart on a display of a data processing system and record an indication of a proposed change for the navigation object in response to a selected user input selecting a navigation object in the navigation chart.

In still yet another advantageous embodiment, a computer program product contains a program code on a computer readable medium. Program code is present for displaying the navigation chart on a display of a data processing system. Program code is also present for recording an indication of a proposed change for a navigation object in response to a selected user input selecting the navigation object in the navigation chart.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
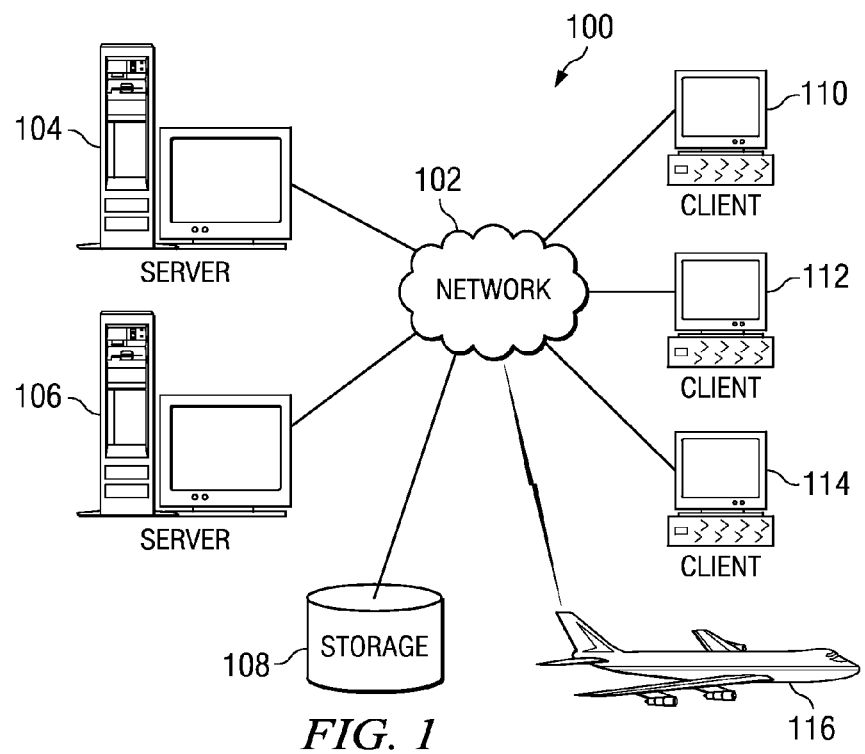
FIG. 1 is a pictorial representation of a network of data processing systems in which the advantageous embodiments may be implemented.
Figure 2:
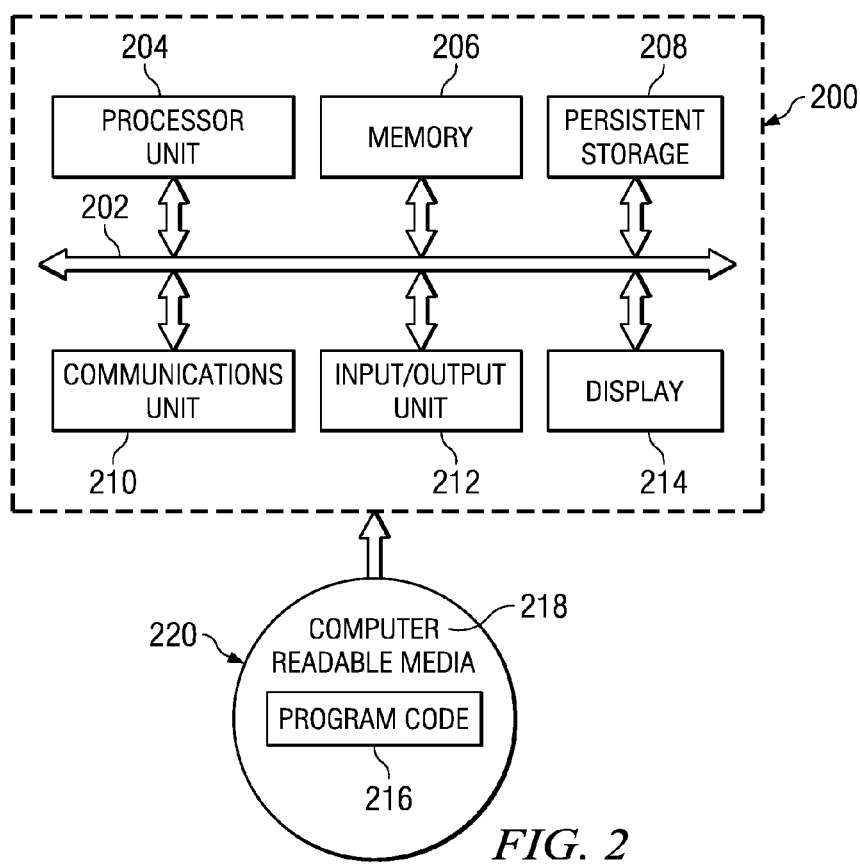
FIG. 2 is a diagram of a data processing system in accordance with an advantageous embodiment.

With reference now to the figures and in particular with reference to FIGS. 1-2, exemplary diagrams of data processing environments are provided in which the advantageous embodiments of the present invention may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114.

Aircraft 116 also may exchange information with servers 104 and 106. Aircraft 116 may exchange data with different computers through a wireless communications link while in-flight or any other type of communications link while on the ground. In these examples, server 104, server 106, client 110, client 112, and client 114 may be computers. Network data processing system 100 may include additional servers, clients, and other devices not shown.

Network data processing system 100 provides an environment in which discrepancy reporting may be provided in electronic map applications and in particular, discrepancies in navigation charts may be identified and reported within network data processing system 100. For example, an electronic map application executing on aircraft 116 may report discrepancies to a navigation chart provider at server 104.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, a diagram of a data processing system is depicted in accordance with an advantageous embodiment. Data processing system 200 is an example of a data processing system that may be used to implement servers and clients, such as server 104 and client 110. Further, data processing system 200 is an example of a data processing system that may be found in aircraft 116 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments provide a computer implemented method, apparatus, and computer program code for identifying proposed changes in navigation charts. In these illustrative examples, navigation charts are those displayed in an aircraft data processing system. In response to a user input selecting a navigation object in the navigation chart, an indication of a proposed change is recorded for the navigation object. This indication of a proposed change may include, for example, changing an attribute in a set of attributes or the navigation object and/or including a textural description of the navigation object. A set of attributes is one or more attributes.

Figure 3:
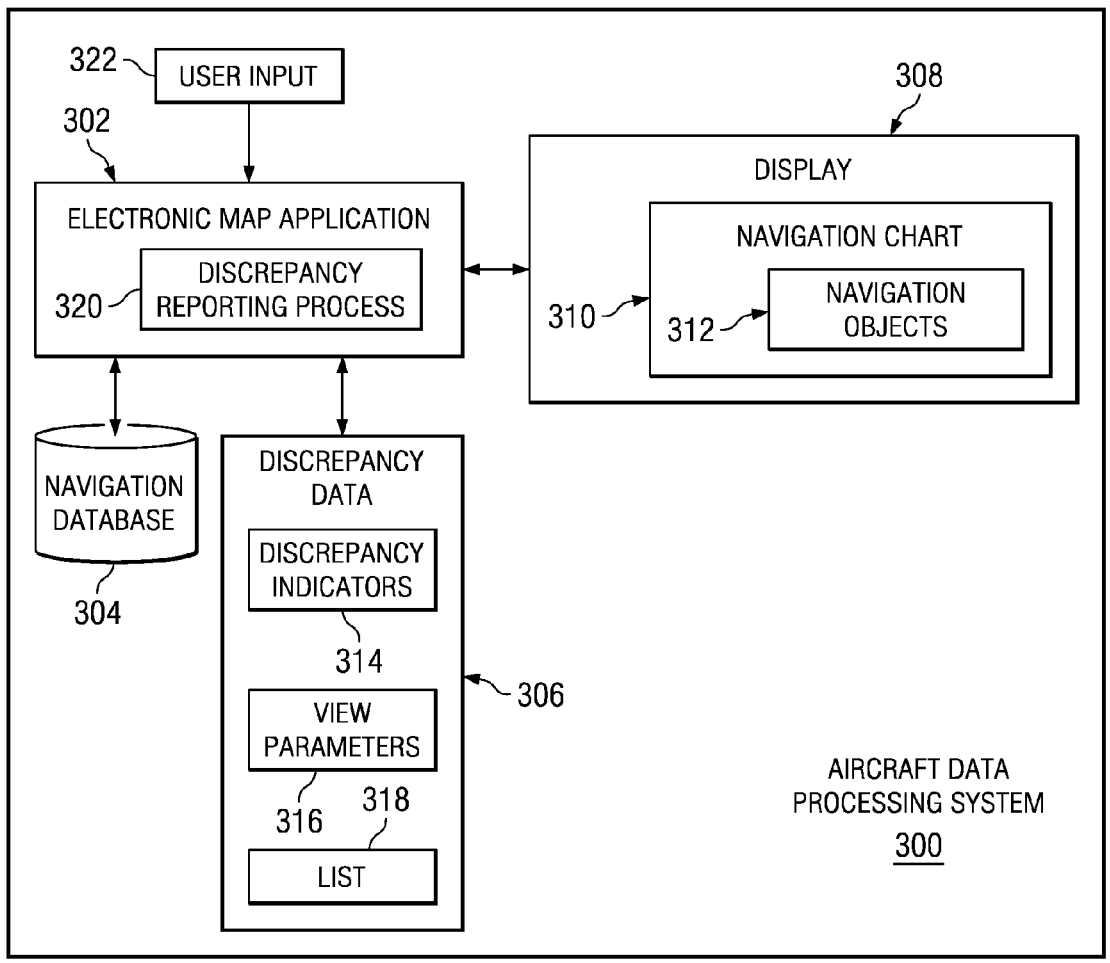
FIG. 3 is a block diagram of an apparatus for identifying proposed changes in a navigation chart in accordance with an advantageous embodiment.

Turning now to FIG. 3 a block diagram of an apparatus for identifying proposed changes in a navigation chart is depicted in accordance with an advantageous embodiment. In this example, aircraft data processing system 300 may be implemented using data processing system 200 in FIG. 2. Aircraft data processing system 300 may take various forms.

For example, aircraft data processing system 300 may be a single data processing system or a network data processing system containing multiple computers or line replaceable units. In these advantageous embodiments, aircraft data processing system 300 may be, in another example, an electronic flight bag. An electronic flight bag is an electronic information management device used by flight crews to form management tasks. An electronic flight bag may, for example, provide navigation charts for air and ground operations. An electronic flight bag also might provide a display of various aviation data as well as performing basic calculations, such as performance data and fuel calculations.

Aircraft data processing system 300 includes electronic map application 302, navigation database 304, discrepancy data 306, and display 308. Display 308 provides a user interface for an operator to see information and charts presented by electronic map application 302. Electronic map application 302 may present navigation data from navigation database 304. For example, navigation chart 310 is an example of a navigation chart that may be found in navigation database 304 and presented on display 308. Electronic map application 302 may present navigation chart 310 in a number of different ways.

In other advantageous embodiments, electronic map application 302 may provide a moving map function. When navigation chart 310 is presented using a moving map function by electronic map application 302, electronic map application 302 may display the location of the aircraft as an icon on navigation chart 310 in display 308. Additionally, the icon may move as the aircraft moves to show the position of the aircraft on navigation chart 310.

In these examples, navigation chart 310 includes navigation objects 312. A navigation object is any physical object, informational object, or other suitable information that may be within navigation chart 310. For example, navigation objects 312 may include, for example, a building, a runway, a radio tower, a mountain, a lake, or some other object. Navigation objects 312 also may include informational objects, such as, for example, very high frequency (VHF) omni-directional radio range (VOR), navigation points, hours of operation, communication frequencies, and other suitable information. Other non-limiting examples of navigation objects include, for example, a helipad, hangars, operational guidance signs, mandatory instruction signs, lighting, weather information, and other suitable informational objects.

Discrepancy data 306 includes discrepancy indicators 314 and screen shots 316. Discrepancy indicators 314 identify navigation objects with proposed changes. Discrepancy indicators 314 may include specific information about the proposed changes identified by a user or operator of electronic map application 302. View parameters 316 may include a copy of all view parameters (current depicted view, zoom level, projection, and visible items) of the screen being displayed on display 308 when an indication of a proposed change in a navigation object was identified. List 318 is a list of proposed change indicators in discrepancy indicators 314 that have not been completed.

Discrepancy reporting process 320 within electronic map application 302 records information within proposed change data 306. For example, a user may notice a discrepancy in a navigation object within navigation objects 312 in navigation chart 310 on display 308. The user may generate a user input 322 that is received to report a proposed change. In response to receiving user input 322, electronic map application 302 generates a proposed change indicator 314 in discrepancy data 306. Further, proposed change reporting process 320 also may generate a view parameter snapshot containing the display of the navigation object in navigation objects 312 in navigation chart 310 being displayed in display 308.

The operator may input information about the discrepancy. This information is stored in discrepancy indicator within discrepancy indicators 314. If, however, the user is unable to enter information about the proposed change in the navigation object, more detailed information about the change in the navigation object may be entered at a later time.

For example, the pilot may be busy performing operations, such as a take-off, a landing, or taxiing. During these periods of time, the pilot may need to concentrate on the task at hand and may not have time to input additional information about the discrepancy other than identifying the navigation object containing the proposed change.

With this situation, the discrepancy indicator is not completed. The identification of the uncompleted discrepancy indicator may be added to list 318. At a later point in discrepancy reporting process 320 may present identified discrepancies in list 318 on display 308. At that time, the user may input information to complete reporting of any discrepancies.

Further, electronic map application 302 may transmit proposed change data 306 to a remote data processing system. This remote data processing system may be owned by a provider of navigation chart 310. Discrepancy data 306 may be sent for reporting when the aircraft is on the ground waiting at an airport or terminal. In other advantageous embodiments, discrepancy data 306 may be transferred while the aircraft is in flight. Discrepancy data 306 may be transferred after some amount of discrepancy data has been collected, or discrepancy data 306 may be transferred each time a discrepancy indicator is generated.

The illustration of different components in aircraft data processing system 300 is not to meant to limit the manner in which different advantageous embodiments may be implemented. For example, discrepancy reporting process 320 is shown as a process within electronic map application 302. In some advantageous embodiments, discrepancy reporting process 320 may be a separate process or application from electronic map application 302. Further, navigation database 304 is shown as being located within aircraft data processing system 300. In other advantageous embodiments, aircraft data processing system 300 may have access to navigation databases in other locations in addition to or in place of navigation database 304.

Figure 4:
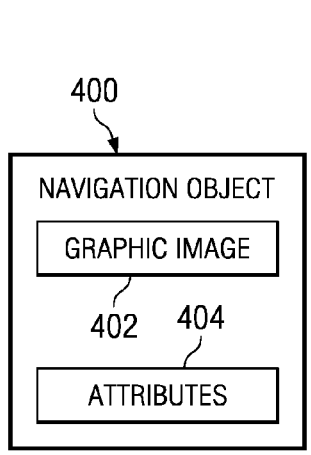
FIG. 4 is a diagram illustrating a navigation object in accordance with an advantageous embodiment.

Turning now to FIG. 4, a diagram illustrating a navigation object is depicted in accordance with an advantageous embodiment. In this example, navigation object 400 is an example of a navigation object within navigation objects 312 in FIG. 3. In this example, navigation object 400 includes graphic image 402 and attributes 404. Graphic image 402 is an image of the navigation object that is displayed to a user. The image may be, for example, a runway, a marker, a building, or some other suitable image.

Attributes 404 contains information about the navigation object. These attributes may include, for example, information about the object, a location of the object, an elevation of the object, a type of object, and other suitable information. In these examples, attributes 404 may include information that may be identified as being a discrepancy by a user. As used herein, a discrepancy is the difference between an object or feature in the real world and the object or feature as described or presented in a navigation chart. The object may be, for example, a runway, a building, a lake, or some other object. The feature may be, for example, a waypoint location, a radio frequency, operating hours, or some other suitable feature.

Figure 5:
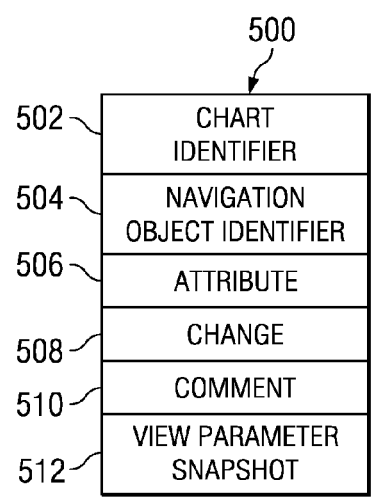
FIG. 5 is a diagram of a discrepancy indicator in accordance with an advantageous embodiment.

Turning now to FIG. 5, a diagram of a discrepancy indicator is depicted in accordance with an advantageous embodiment. In this example, discrepancy indicator 500 is an example of a discrepancy indicator in discrepancy indicators 314 in FIG. 3. In this example, discrepancy indicator 500 is a data structure containing discrepancy indicator 500 which may be a separate data structure or may be contained as part of a table, database, linked list, or some other suitable arrangement. Discrepancy indicator 500 includes chart identifier 502, navigation object identifier 504, attribute 506, change 508, comment 510 and screen shot 512.

Chart identifier 502 identifies the navigation chart in which the discrepancy was identified for a navigation object. Navigation object identifier 504 identifies the particular navigation object having the discrepancy. Attribute 506 identifies a set of attributes in which a discrepancy is identified. As used herein, a set refers to one or more items. For example, a set of attributes is one or more attributes.

Change 508 contains the change to the set of attributes entered by a user. Comment 510 may include additional textual information about the discrepancy. Comment 510 also may include proposed updates or other information. View parameter snapshot 512 identifies the screen shot containing a copy of the display of the navigation object on the navigation chart when a discrepancy was identified by the user. Screen shot 512 includes a pointer or universal resource locator to the copy of the display. In other embodiments, screen shot 512 may actually contain the copy of the display.

If a user is unable to fill in the information about the particular discrepancy and changes, discrepancy indicator 500 may only include chart identifier 502 and navigation object identifier 504. In some cases, screen shot 512 also may be present.

Figure 6:
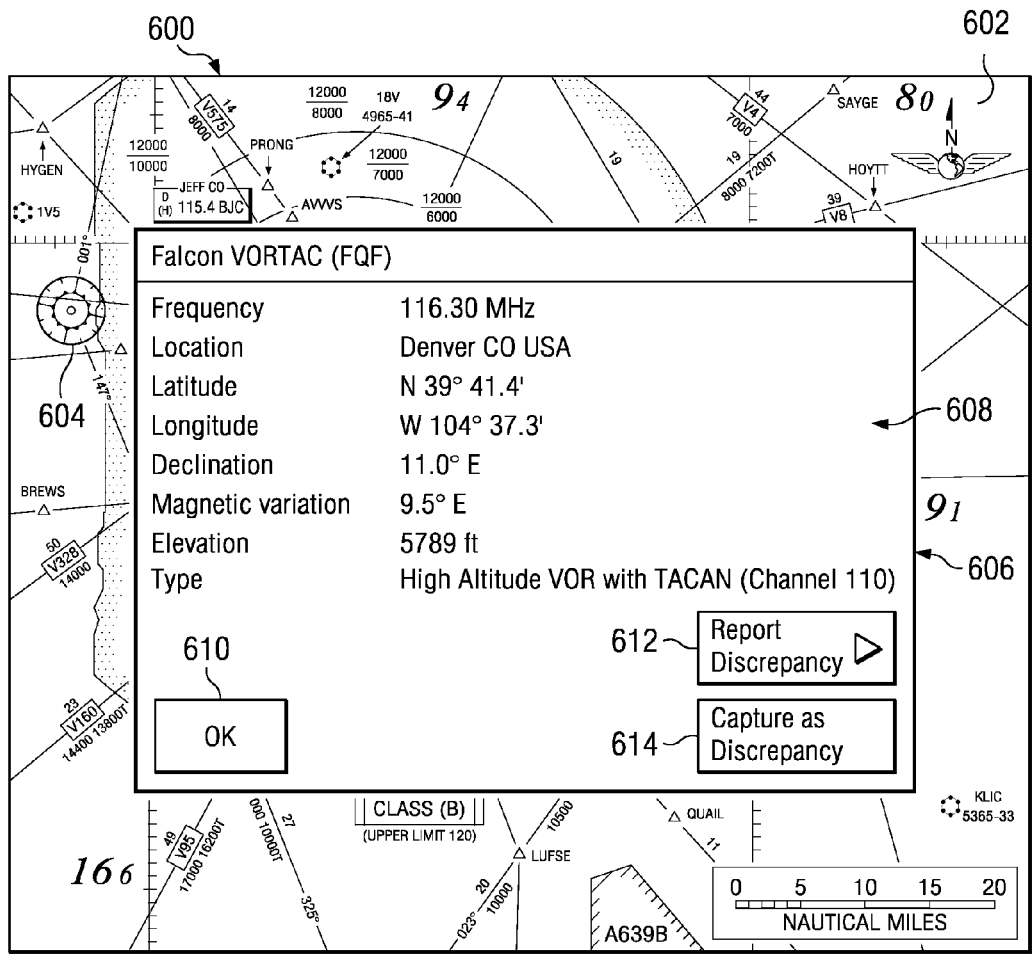
FIG. 6 is an example of a display presented to identify discrepancies in accordance with an advantageous embodiment.

Turning now to FIG. 6, an example of a display presented to identify discrepancies is depicted in accordance with an advantageous embodiment. In this example, screen 600 is an example of a screen displayed on a display such as display 308 in FIG. 3. In this example, screen 600 includes navigation map 602. In this example a user has identified a discrepancy in navigation object 604, which is a VHF omni-directional radio range in this example.

Window 606 is presented when the user identifies navigation object 604 containing the discrepancy. In this example, window 606 is a pop-up window in which information about the navigation object is displayed in section 608.

The user may cancel the discrepancy reporting by selecting okay button 610. If the user desires to report the discrepancy, the user may select report discrepancy button 612. If the user does not have time to enter discrepancy information, the user may select capture as discrepancy button 614. Selection of this button causes a discrepancy indicator to be generated such as discrepancy indicator 500 in FIG. 5. In this situation, the discrepancy indicator contains an identification to the navigation chart, the navigation object, and a view parameter snapshot of screen 600. The discrepancy indicator also is added to the list for later completion. At that point, the user may select okay button 610 and return to operating the aircraft and report the discrepancy at another time.

Figure 7:
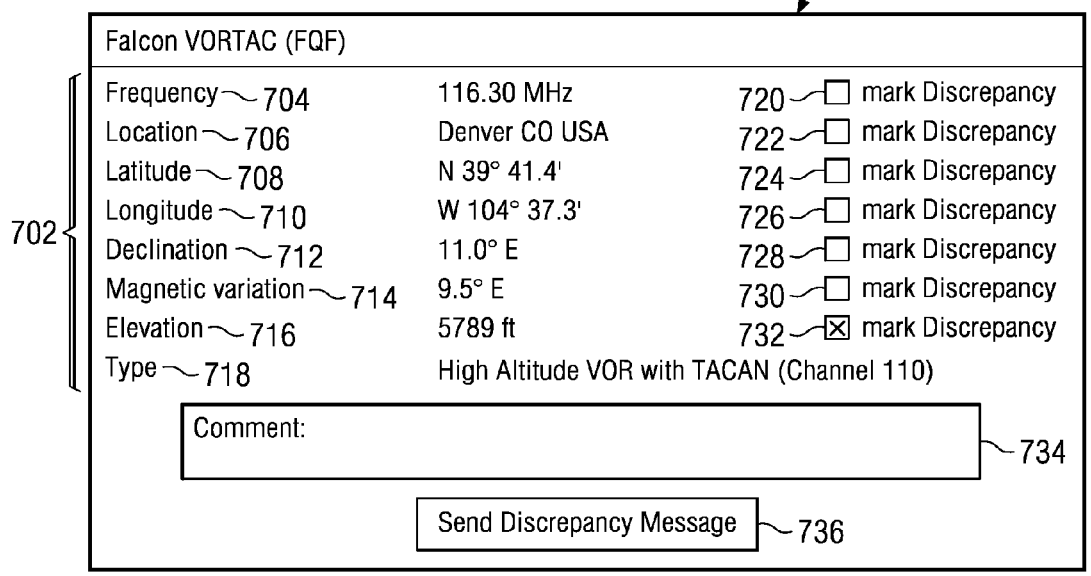
FIG. 7 is a display of a discrepancy reporting screen in accordance with an advantageous embodiment.

With reference now to FIG. 7, a display of a discrepancy reporting screen is depicted in accordance with an advantageous embodiment. In this example, screen 700 is an example of a discrepancy reporting screen that may be presented on a display, such as display 308 in FIG. 3. Screen 700 is presented in response to the selection of a button, such as report discrepancy button 612 in FIG. 6. Additionally, screen 700 may be presented if a discrepancy indicator is selected from a list of discrepancy indicators when reporting discrepancies at a later point in time.

In this example, screen 700 displays attributes in section 702. In these examples, the attributes include, for example, frequency 704, location 706, latitude 708, longitude 710, declination 712, magnetic variations 714, elevation 716, and type 718.

Discrepancies for some of these attributes may be marked by selecting check boxes 720, 722, 724, 726, 728, 730, and 732. Additionally, a user may input textual information in comment field 734. When the user is finished entering information about the discrepancy, the user may select send discrepancy message 736. At this point in time, the discrepancy data may be stored in the discrepancy indicator for storage. The discrepancy information may be transmitted immediately or at a later time.

Figure 8:
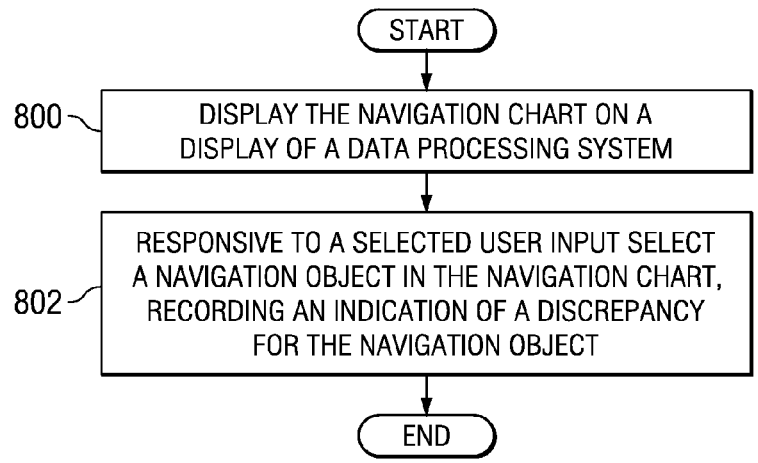
FIG. 8 is a high level flowchart of a process for recording issues in accordance with an advantageous embodiment.

With reference now to FIG. 8, a high level flowchart of a process for recording discrepancies is depicted in accordance with an advantageous embodiment. The process in FIG. 8 may be implemented in a software component, such as discrepancy reporting process 320 in FIG. 3.

The process begins by displaying a navigation chart on the display of a data processing system (operation 800). The navigation chart displayed in operation 800 may take various forms. The navigation chart may be a static navigation chart or a navigation chart used in a moving application.

Thereafter, responsive to a selected user input selecting navigation object in the navigation chart, the process records an indication of a discrepancy for the navigation chart (operation 802) with the process terminating thereafter. In operation 802, the selected user input may take a different form. For example, a curser may be placed over the navigation object with a selected mouse click or menu selection. Alternatively, the selected user input may be a selection of the navigation object through a touch screen display.

Figure 9:
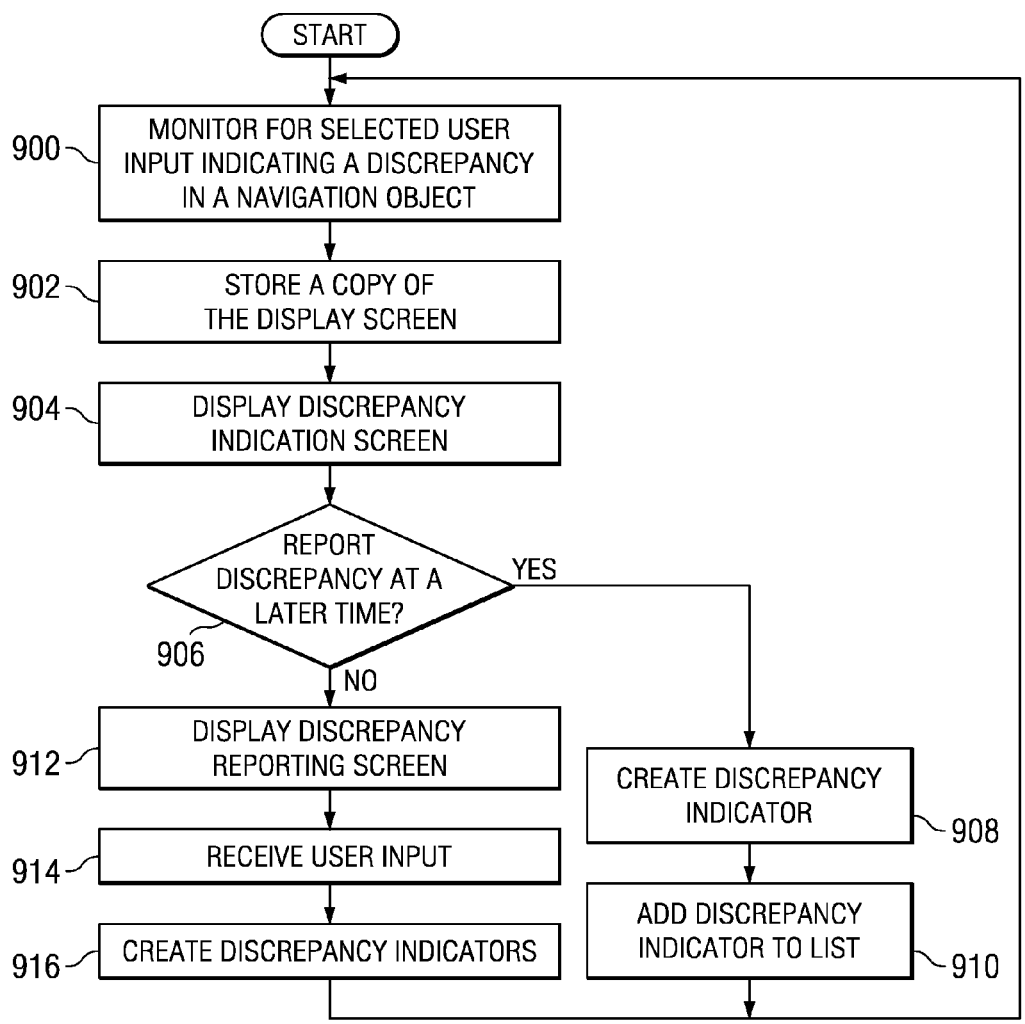
FIG. 9 is a flowchart of a process for monitoring for reported chart changes in accordance with an advantageous embodiment.

With reference now to FIG. 9, a flowchart of a process for monitoring for discrepancies is depicted in accordance with an advantageous embodiment. The process illustrated in FIG. 9 may be implemented in a software component, such as discrepancy reporting process 320 in FIG. 3. This process executes while the electronic map application displays navigation charts on a display in a data processing system.

The process begins by monitoring for a selected user input indicating a discrepancy in a navigation object (operation 900). This user input may take various forms. For example, the user input may be a selection of the navigation object with a pointer in conjunction with a command. This command may be initiated by the pressing of a mouse button, selection of the command from a menu, or some other user input.

In response to receiving the selected user input, a copy of the display is stored (operation 902). This copy is a snapshot of the current view parameters of the display at the time the user indicated that a discrepancy is present in a navigation object. This screen shot may be useful for allowing the user to remember what discrepancy was identified if the discrepancy is not reported immediately. Further, even if the discrepancy is reported immediately, this screen shot may provide a context for later analysis of the discrepancy.

The process then displays a discrepancy indication screen (operation 904). In these examples, the discrepancy indication screen provides the user an opportunity to determine when to process or report the discrepancy. This screen is similar to screen 600 in FIG. 6. A determination is made as to whether the discrepancy is to be reported at a later time (operation 906).

If the discrepancy is to be reported at a later time, the discrepancy indicator is created (operation 908). In these examples, the discrepancy indication is a data structure that is partially filled with discrepancy information. This discrepancy indication may be, for example, similar to discrepancy indicator 500 in FIG. 5. The process then adds the discrepancy indication to a list (operation 910). The list in operation 910 may be, for example, list 318 in FIG. 3. This list may be used at a later time to process or fully report any discrepancies that have been identified. The process then returns to operation 900.

With reference again to operation 906, if the discrepancy is not to be reported at a later time, the process displays a discrepancy reporting screen (operation 912). This discrepancy reporting screen allows a user to identify the discrepancy in the navigation object. Screen 700 in FIG. 7 is an example of a discrepancy reporting screen that may be used. Thereafter, the process receives user input (operation 914). The process then creates a discrepancy indicator from the user input (operation 916) with the process then returning to operation 900 as described above. In this instance, the discrepancy indicator is fully filled or complete.

Figure 10:
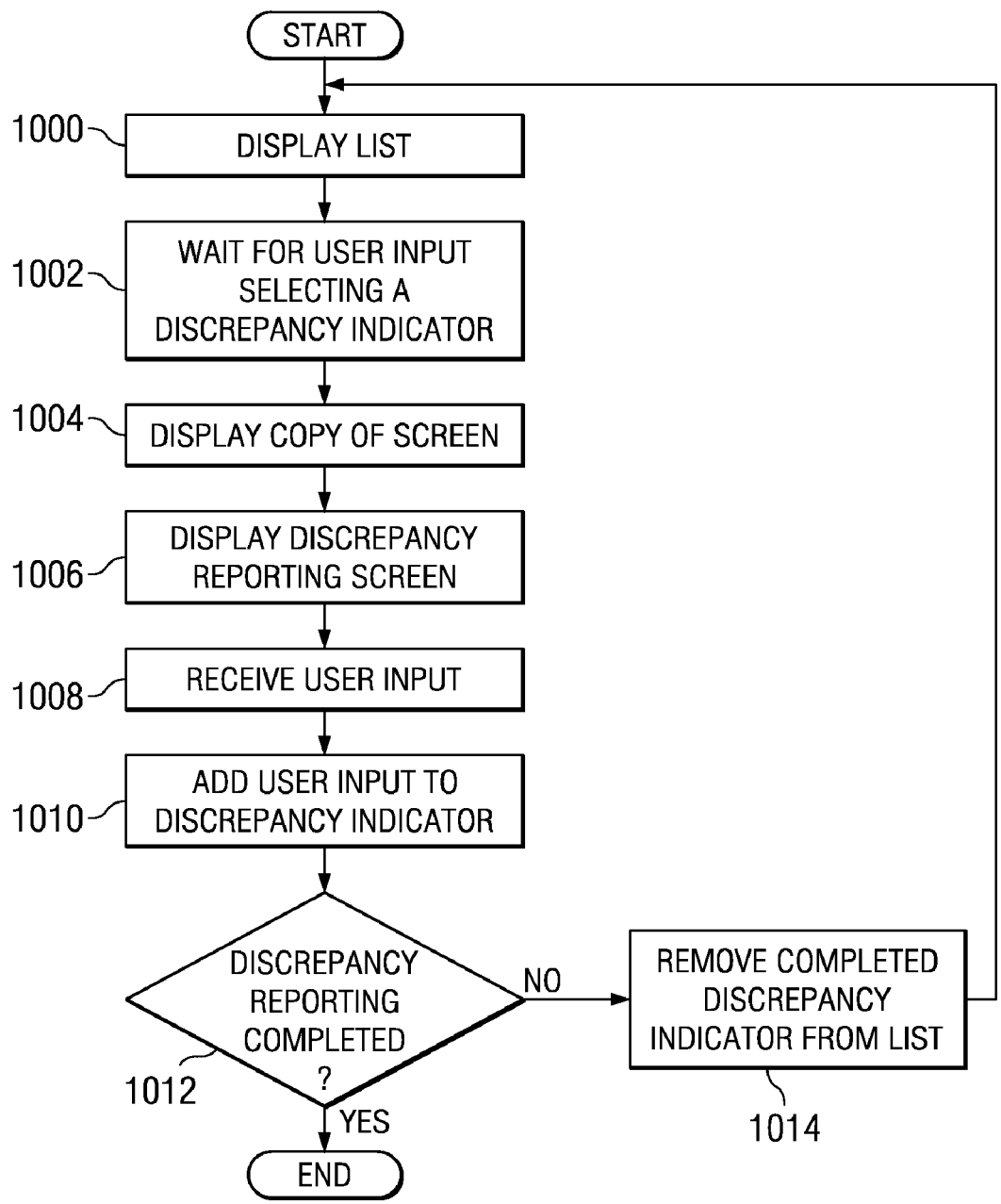
FIG. 10 is a flowchart of a process for processing previously identified chart changes in navigation objects in accordance with an advantageous embodiment.

With reference now to FIG. 10, a flowchart of a process for processing previously identified discrepancies in navigation objects is depicted in accordance with an advantageous embodiment. The process illustrated in FIG. 10 may be implemented in a software component, such as discrepancy reporting process 320 in FIG. 3. This process is initiated at some point in time after one or more navigation objects have been identified as having discrepancies. This processing may occur, for example, after a flight is completed while the aircraft crew is preparing for another flight.

The process begins by displaying a list of discrepancy indicators (operation 1000). This list may be, for example, list 318 in FIG. 3. This list is generated in operation 910 in FIG. 9 when a user does not have time to complete reporting of the discrepancy in the navigation object.

The process then waits for a user input, selecting an item from the list (operation 1002). In response to a selection of a discrepancy indicator from the list, the process displays a copy of the screen saved when the user input generating the discrepancy indicator was received (operation 1004). The presentation of this display may aid the user in reporting the discrepancy.

The process then displays a discrepancy reporting screen (operation 1006). In operation 1006, the discrepancy reporting screen may be, for example, screen 700 in FIG. 7. This discrepancy reporting screen allows the user to identify what attributes may be different in the navigation object as compared to the real world equivalent to the navigation object, as well as provide commentary about the discrepancy.

The process receives user input (operation 1008), and adds the user input to the discrepancy indicator (operation 1010). The process then determines whether discrepancy reporting has completed (operation 1012). In these examples, the discrepancy reporting completes if all of the discrepancy indicators in the display list have been processed. The discrepancy reporting also may complete if the user decides to stop processing discrepancy indicators. If discrepancy reporting has completed, the process terminates. Otherwise, the process removes the completed discrepancy indicator from the list (operation 1014) with the process then returning to operation 1000 to display any remaining discrepancy indicators.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a computer implemented method, apparatus and computer usable program code for recording discrepancies in navigation objects on navigation charts. In the different advantageous embodiments, a selection of the navigation object in the navigation chart may be received through a data processing system displaying the navigation chart. In response to receiving the selection, an indication of the discrepancy for a navigation object may be recorded. This recording may include presenting a set of attributes for the navigation object in which each attribute may have a discrepancy state. In response to using a user input to change the attribute in the set of attributes, this attribute is changed and stored as part of a discrepancy indicator.

In other advantageous embodiments, the recording of the indication of the discrepancy may be storing an identification of the navigation object in the chart. Additional information may not be recorded immediately depending on whether the user is able to provide additional information at that time. In many cases, the user has other tasks requiring immediate attention. Additional information may be added to the discrepancy indicator at a later time in this type of situation.

With the different advantageous embodiments, the likelihood of reporting discrepancies in navigation charts, especially for aeronautical navigation charts, is increased. The different advantageous embodiments simplify the discrepancy reporting process. With a simplified process, the reporting of minor non-safety related discrepancies increases. In this manner, navigation charts may be made more accurate. For example, a user is more likely report that the operational hours of an airport is incorrect if the reporting process is simplified.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. For example, the different advantageous embodiments may be applied to reporting discrepancies in electronic map applications for other vehicles such as, for example, trucks, ships, submarines, and spacecraft. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method for identifying a discrepancy in a navigation chart displayed in an aircraft data processing system, the method comprising:
   receiving a selection of a navigation object in the navigation chart through the aircraft data processing system;
   responsive to receiving the selection, presenting a set of attributes for the navigation object, wherein each attribute can be selected containing a discrepancy;
   displaying the set of attributes for the navigation object;
   receiving user input to change an attribute state in the set of attributes, wherein the user input comprises selection of a report discrepancy button; and
   changing the attribute state using the user input.

2. The computer implemented method of claim 1 further comprising:
   responsive to receiving a different type of selection of the navigation object prior to receiving the selection, marking the navigation object as having a discrepancy.

3. The computer implemented method of claim 2 further comprising:
   presenting a list of navigation objects in the navigation chart marked as having an associated discrepancy for the user input for the selection.

4. The computer implemented method of claim 1 further comprising:
   sending all changed attributes to a remote data processing system.

5. The computer implemented method of claim 1 further comprising:
   sending all changed state attributes after a flight has been completed.

6. The computer implemented method of claim 1, wherein the user input to change the attribute comprises a textual description of a discrepancy in the navigation object.

7. The computer implemented method of claim 1, further comprising:
responsive to receiving the selection, storing a copy of a display of the navigation chart at a time the selection was received.

8. The computer implemented method of claim 1 further comprising:
displaying the navigation chart using a moving map application executing on the aircraft data processing system.

9. The method of claim 1, wherein the user input to change an attribute comprises an elevation of the navigation object.

10. The method of claim 1, wherein the user input to change an attribute comprises a frequency of the navigation object.

11. The method of claim 1, wherein the user input to change an attribute comprises a latitude and longitude of the navigation object.

12. The method of claim 1, wherein the step of displaying the set of attributes for the navigation object comprises displaying the set of attributes for the navigation object in a discrepancy indication window.

13. The method of claim 12, wherein the step of displaying the set of attributes for the navigation object in a discrepancy indication window, overlays the window over the navigation chart.

14. The method of claim 12, wherein the user input comprising selection of a report discrepancy button further comprises the report discrepancy button in the discrepancy indication window.

15. A computer implemented method for identifying discrepancies in a navigation chart, the computer implemented method comprising:
displaying the navigation chart on a display of a data processing system;
displaying a set of attributes for a navigation object in the navigation chart; and
responsive to a selected user input selecting the navigation object in the navigation chart, recording an indication of a discrepancy for the navigation object, wherein the user input comprises selection of a report discrepancy button.

16. The computer implemented method of claim 15 further comprising:
sending the indication to a source of the navigation chart.

17. The computer implemented method of claim 15, wherein the recording step comprises:
presenting a set of attributes associated with the navigation object on the display; and
responsive to receiving a particular user input to change an attribute in a set of attributes, recording a change in the attribute as part of the indication.

18. The computer implemented method of claim 15, wherein the recording step comprises:
marking the navigation object for later processing;
presenting the navigation object during later processing to form a presented navigation object; and
receiving user input identifying a discrepancy for the presented navigation object.

19. The computer implemented method of claim 15, further comprising:
responsive to the selected user input selecting the navigation object in the navigation chart, storing a copy of a portion of the navigation chart being displayed in the display at a time the selected user input was received.

20. The computer implemented method of claim 15, wherein the displaying step comprises comprising:
displaying the navigation chart on the display of the data processing system using a moving map application.

21. The computer implemented method of claim 15, wherein the navigation chart is for one of an aircraft, a ship, and a spacecraft.

22. A data processing system comprising:
a bus;
a communications unit connected to the bus;
a storage device connected to the bus, wherein the storage device includes computer usable program code; and
a processor unit connected to the bus, wherein the processor unit executes the computer usable program code to display a navigation chart on a display of a data processing system, display a set of attributes for a navigation object in the navigation chart, and record an indication of a discrepancy for the navigation object in response to a selected user input selecting the navigation object in the navigation chart, wherein the user input comprises selection of a report discrepancy button.

23. The data processing system of claim 22, wherein in executing the program code to record the indication of the discrepancy for the navigation object in response to the selected user input selecting the navigation object in the navigation chart, the processor executes the program code to present a set of attributes associated with the navigation object on the display; and record a change in the attribute as part of the indication in response to receiving the user input to change an attribute in a set of attributes.

24. A computer program product for identifying discrepancies in a navigation chart, the computer program product comprising:
a computer readable medium;
program code, stored on the computer readable medium, for displaying the navigation chart on a display of a data processing system;
program code, stored on the computer readable medium, for displaying a set of attributes for a navigation object in the navigation chart; and
program code, stored on the computer readable medium, responsive to a selected user input selecting the navigation object in the navigation chart, for recording an indication of a discrepancy for the navigation object, wherein the user input comprises selection of a report discrepancy button.

25. The computer program product of claim 24, wherein the program code, stored on the computer readable medium, responsive to the selected user input selecting the navigation object in the navigation chart, for recording the indication of the discrepancy for the navigation object comprises:
program code, stored on the computer readable medium, for presenting a set of attributes associated with the navigation object on the display; and
program code, stored on the computer readable medium, responsive to receiving a particular user input to change an attribute in a set of attributes, for recording a change in the attribute as part of the indication.

26. The computer program product of claim 24, wherein the program code, stored on the computer readable medium, responsive to the selected user input selecting the navigation object in the navigation chart, for recording the indication of the discrepancy for the navigation object comprises:
program code, stored on the computer readable medium, for marking the navigation object for later processing;
program code, stored on the computer readable medium, for presenting the navigation object during later processing to form a presented navigation object; and
program code, stored on the computer readable medium, for receiving user input identifying a discrepancy for the presented navigation object.

* * * * *